United States Patent [19]
Gamou et al.

[11] Patent Number: 5,122,643
[45] Date of Patent: Jun. 16, 1992

[54] IC CARD SYSTEM

[75] Inventors: Hiroshi Gamou; Takeshi Inoue, both of Itami, Japan

[73] Assignee: Mitsubishi Denki Kabushiki Kaisha, Tokyo, Japan

[21] Appl. No.: 484,078

[22] Filed: Feb. 23, 1990

Related U.S. Application Data

[63] Continuation-in-part of Ser. No. 284,849, Dec. 13, 1988, abandoned, which is a continuation of Ser. No. 32,237, Mar. 31, 1987, abandoned.

[30] Foreign Application Priority Data

Apr. 10, 1986 [JP] Japan .................................. 61-83800

[51] Int. Cl.⁵ ...................... G07B 15/02; G06K 15/00
[52] U.S. Cl. .................................... 235/384; 235/375; 235/381

[58] Field of Search ............... 235/384, 419, 420, 423, 235/424, 487, 375, 376, 377, 378, 380, 381, 382

[56] References Cited

U.S. PATENT DOCUMENTS 4,705,211  11/1987  Honda et al. ...................... 235/380

Primary Examiner—A. D. Pellinen
Assistant Examiner—Jeffrey A. Gaffin
Attorney, Agent, or Firm—Fleit, Jacobson, Cohn, Price, Holman & Stern

[57] ABSTRACT

An IC card system comprises an IC card containing a semiconductor module with a CPU and a memory and a display section for displaying the contents of the memory, and a card terminal into which the IC card can be inserted, and which, when the IC card is inserted therein, reads the contents of the memory, and controls the display contents of the display section of the card in accordance with the contents of the memory.

6 Claims, 4 Drawing Sheets

IC CARD SYSTEM

CROSS-REFERENCE APPLICATIONS

This application is a continuation-in-part of U.S. patent application Ser. No. 07/284,849 filed December 13, 1988, which is a continuation of U.S. patent application Ser. No. 07/032,237 filed Mar. 31, 1987, each now abandoned.

BACKGROUND OF THE INVENTION

The invention relates to an IC card system which is comprised of an IC card and an IC card terminal.

IC cards possess internal data processing functions (CPU functions) and memory functions. Because of the CPU functions, they have the characteristics of accurate verification of the holder and the card itself and so forth, as well as simplified prevention against data reading, writing, and alteration. Moreover, they can be designed to have a large memory capacity. They have therefore been anticipated not only as a substitute for conventional magnetic cards but also for new applications.

For example, the above-mentioned IC card can be used as a coupon ticket and the procedure for use of the card in this case will be described below. First, the issuer stores the amount of money or number of times the card can be used in the memory section of the IC card using a specific code number and keyword not known to others. The user purchasing this card inserts it into a terminal controlled by the issuer each time he uses the card, and the number of times or amount of money used is subtracted. Additionally, if an electrically erasable and programmable memory (EEPROM) is used for the card memory, when the remaining amount of money or number of transactions left reaches zero, the user can bring the card to the issuer and by paying money, the usable amount of money or number of times can be stored in the card again. This allows the same card to be used as a coupon ticket any number of times. This has the benefit of allowing the user to purchase only the required number of times, unlike conventional coupon tickets which had a fixed number of times.

Furthermore, because the card itself possesses calculation functions it is easily possible to use the card for multiple purposes, for example for bus, trains, etc., and to make price settlement (coupon ticket settlement). In addition, cards issued by different issuers can be used interchangeably and settlement can be made easily by use of the CPU and memory functions of the card.

Additionally in these cases, forgery of these cards or malicious data writing to the cards is extremely difficult. The cards are therefore superior to magnetic cards in this regard.

However, when the cards are used as coupon tickets in the above example, there is the drawback that the remaining amount of money or number of times cannot be easily determined by having a look at it. This is preventing the use of IC cards for coupon tickets, for example.

SUMMARY OF THE INVENTION

An object of the invention is to provide an IC card system which allows visual confirmation or recognition of the remaining amount of money or number of transactions remaining, or any other value stored in the memory of the IC card.

Another object of the invention is to provide an IC card system which allows easy and quick visual confirmation or recognition of such values stored in the memory of the IC card. A further object of the invention is to increase the range of applications of the IC cards.

An IC card system of this invention has a rewritable display section in the IC card, which is rewritten when the data of the internal memory is changed, in accordance with the data of the memory section.

In this invention, when the IC card is used, for example, as the above described coupon ticket, the display section provided on the IC card displays the remaining amount of money or number of transactions remaining, and when the card is used, the remaining amount of money or number of transactions which comprises the display contents of the IC card is rewritten by the terminal, allowing the user to confirm or recognize this data by looking at it.

DESCRIPTION OF THE PREFERRED EMBODIMENT

An embodiment of this invention will now be described with reference to the drawings.

Figure 1:
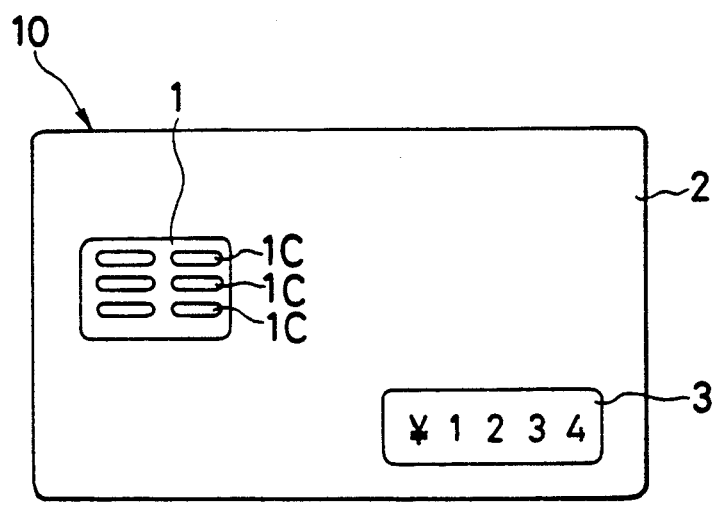
FIG. 1 is a plan view of an IC card used in an IC card system of an embodiment of this invention.
Figure 8:
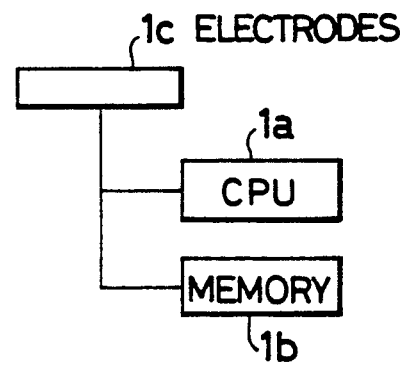
FIG. 8 is a block diagram showing components of the module 1.

FIG. 1 shows an IC card used by an IC card system of an embodiment of this invention. The IC card 10 comprises a semiconductor module 1 which comprises, as shown in FIG. 8, a semiconductor CPU 1a, semiconductor memory 1b, electrodes 1c, and a wiring board (not shown) for attachment and wiring of these. This module 1 is embedded in a card substrate 2. The IC card 10 further comprises a visual magnetic display section 3 which is also embedded in the above-mentioned card substrate 2. The display section 3 is electrically independent of the semiconductor module 1 and does not receive any information or control signals from the semiconductor module 1.

The CPU of the IC card 10 of this embodiment also has verification functions and data protection functions which prohibit data alteration, reading, and writing according to the verification results of the verification functions i.e., when the verification is unsuccessful. The memory is used to store values such as the remaining amount of money or number of transactions remaining in the event the IC card is used as a coupon ticket. The memory may also be used to store an amount or the number of times that the card has been used.

Figure 2:
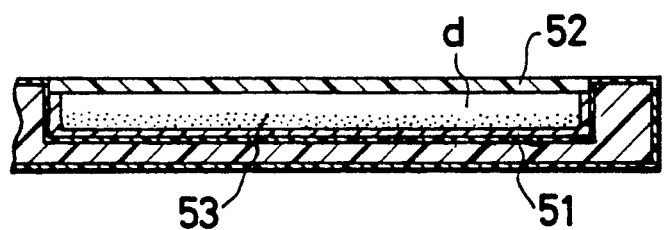
FIG. 2 is a sectional view showing an example of the display section.

An example of the visual magnetic display section 3 is shown in FIG. 2. The display section shown in FIG. 2 has magnetic particles 53 with a high permeability enclosed together with a special minute powder fluidizing material in a spaced formed between a magnetic recording sheet 51 and a transparent sheet 52. Magnetizing the magnetic recording sheet 51 with a desired pattern will cause the magnetic particles to be attracted there and become visible. An example of such a display section is shown in Japanese Utility Model Application Laying-open No. 151924/1983, in which the N-poles and S-poles of the particle magnets are colored differently and rotated depending on the external magnetic field applied thereto to show different colors. The description of the abovementioned Laying-open No. 151924/1983 is incorporated herein by reference.

Figure 3:
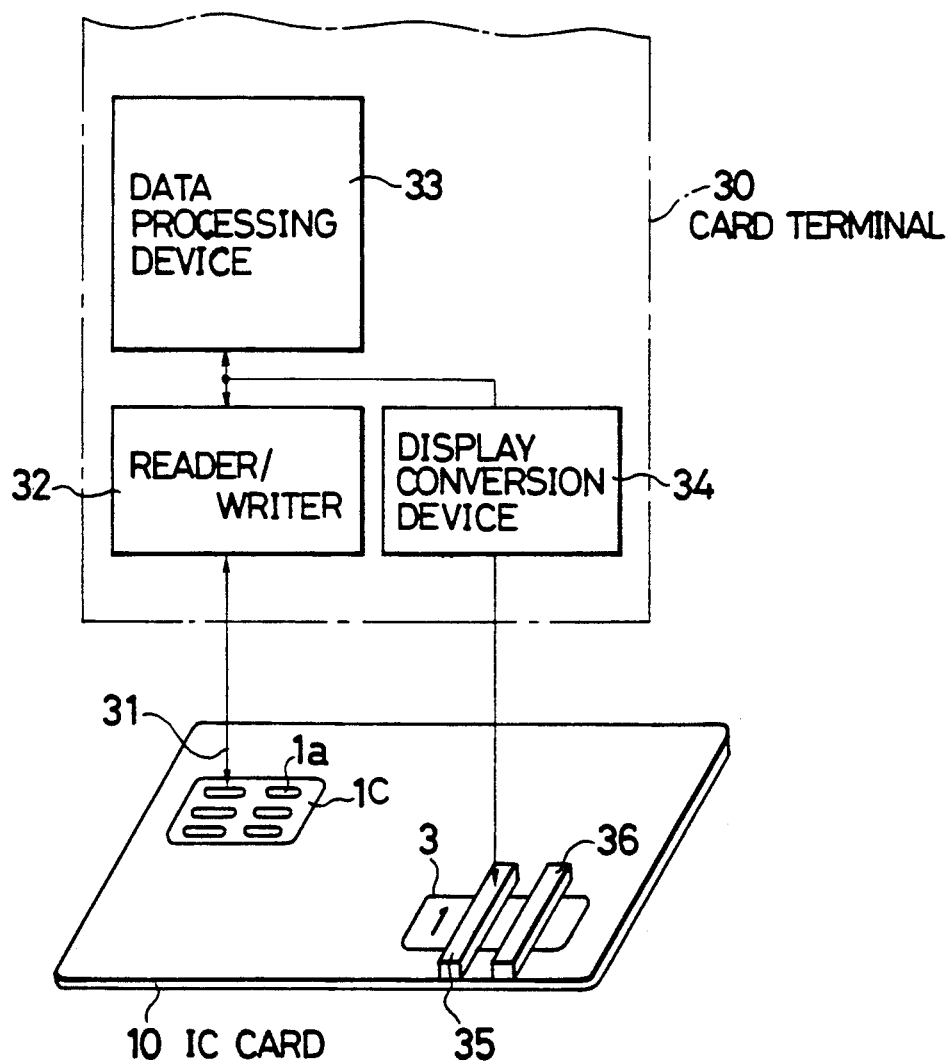
FIG. 3 is a diagram showing the functional blocks of this system.
Figure 4:
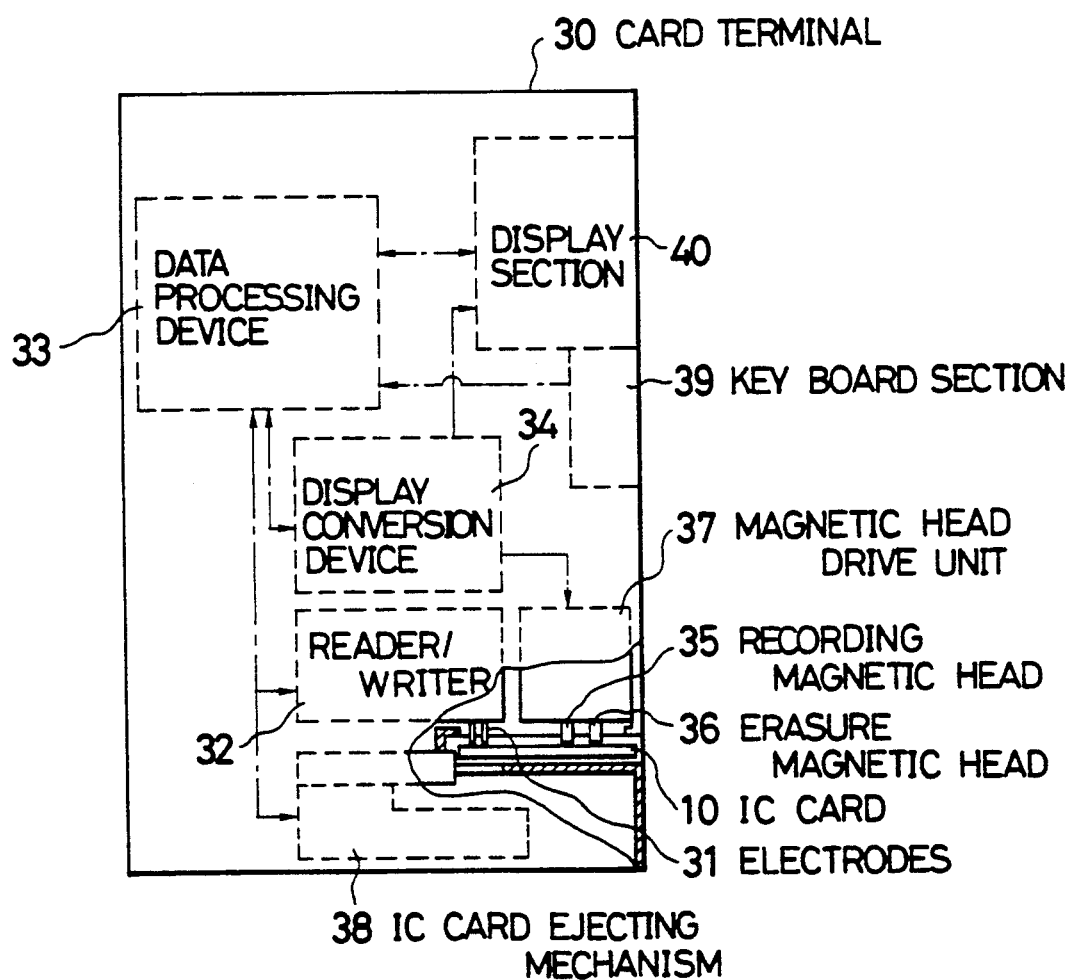
FIG. 4 is a schematic diagram showing disposition of and interconnection between various elements and parts within the terminal.

The IC card 10 is inserted into a card terminal 30 shown in FIG. 3 and FIG. 4 and data is exchanged with the terminal 30. The card terminal 30 is provided with electrodes 31 for contact with the electrodes 1c on the IC card 10 for reading and writing data from and into the memory 1b, a reader/writer 32 for exchanging data with the IC card 10, a data processing device 33 for performing data calculation processing, a display conversion device 34 for preparing the data to be displayed on the display section 3 of the IC card 10, and a magnetic head 35 for recording data, and a magnetic head 36 for erasing data. The card terminal 30 further comprises a magnetic head drive unit 37 for controlling electric current for magnetizing the magnetic heads 35 and 36, and an IC card ejecting mechanism 38 for pushing out the IC card when the processing (reading/writing on the memory and controlling on the display section) on the IC card is completed. The card terminal 30 further comprises a keyboard section 39 for inputting data into the data processing device 33 of the card terminal 30 and allowing other manipulation of the card terminal 30, and a display section 40 for displaying various data on the surface of the card terminal 30.

The operation of this system will be described with reference to the functional block diagram of FIG. 3.

FIG. 3 shows an IC card 10 inserted into a card terminal 30. When the card 10 is inserted into the card terminal 30, the electrodes 1c of the module 1 come into contact with the electrodes 31 of the terminal 30 and data is exchanged between the data processing device 33 and the memory 1b through the CPU 1a of the IC card 10 according to the control signals output from the reader/writer 32 of the terminal 30. After verification of the card such as confirmation of the issuer, and confirmation of the point of boarding, and calculation of travelled distance and fare, etc., settlement is made and the remaining total is recorded in the memory section 1b in the module 1 in the IC card 10. At the same time, the stored data of the semiconductor memory section 1b is read by the reader/writer 32 and sent to the data processing device 33. On the basis of stored data, the data processing device 33 selects the data to be displayed, and supplies it to the display conversion device 34. Here it is converted to numeric character pattern and the above-mentioned remaining total is displayed on the display section 3 of the card through the recording magnetic head 32. Prior to display by the above magnetic head 35, the previous indication is erased by the erasure head 36.

In this embodiment, as the remaining amount of money is always displayed on the surface of the card, it is convenient for use of this system for coupon tickets, etc.

Figure 5:
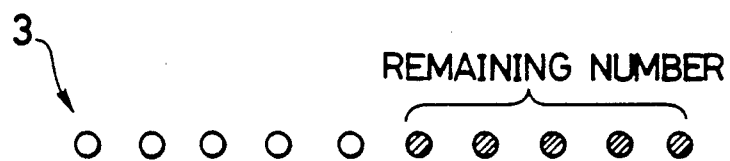
FIG. 5 through FIG. 7 are diagrams showing IC card display sections of other embodiments of this invention.
Figure 6:
Figure 7:
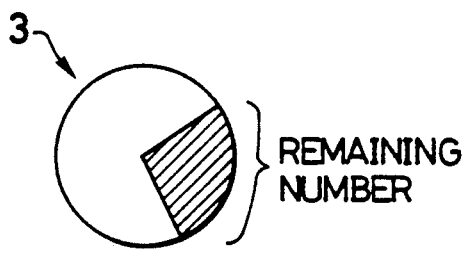

In the present invention a numeric indication is made by the display section, but other types of display can also be made, for instance percentage indication (percentage with respect to the initial or total value stored in the IC card) according to the number of transactions remaining or used, such as the erasing of dots shown in FIG. 5, indication by bar length as shown in FIG. 6, indication by circle as shown in FIG. 7, can be adopted. Other display patterns in which the area or proportion thereof to the total area of a certain color or brightness level is varied with the value of the contents of the memory can also be used. The selection between various types of display can be made to suit the particular use or the field of application.

As described above, this invention provides a display section in the card itself and when the card is used, and the contents of the memory of the card is changed, the new contents are read by the terminal and the card display is changed according to the new contents. It is therefore possible to realize an IC card system useful for application in various fields.

The above description is intended by way of example only and is not intended to limit the present invention in any way except as set forth in the following claims.

What is claimed is:

1. An IC card system comprising:
   an IC card containing a semiconductor module with a CPU and a memory for storing information, and a display section electrically independent of said semiconductor module for displaying the information that is stored in said memory; and
   a card terminal into which the IC card can be inserted, said card terminal including a display conversion means and a read/write means so that when the IC card is inserted therein, said read/write means is capable of reading previous information in the memory and storing new information in said memory, and said display conversion means receiving as input said previous or new information and being capable of altering the contents of the display section of the card in accordance with said previous or new information in the memory, said read/write means and said display conversion means of said card terminal functioning independently of said CPU of said IC card when displaying information on said display section.

2. An IC card system as set forth in claim 1, wherein the CPU of the IC card has verification functions and data protection functions which prevent data alteration, reading, and writing according to verification results.

3. An IC card system as set forth in claim 1, wherein the display section of the IC card comprises a magnetic displaying means which is rewritable and is capable of display in the form of visible images, and said card terminal comprises a magnetic head for writing data in the magnetic displaying means.

4. An IC card system as set forth in claim 1, wherein said information stored in said memory represents an amount or the number of transactions remaining or that have been used, and said card terminal reads the information from said memory of the IC card and converts the information that is stored in said memory into display pattern data for percentage indication and controls the display contents of the display section in accordance with the display pattern data.

5. An IC card system comprising:
   an IC card including a semiconductor module having a CPU and a memory for storing information, and a display section electrically independent of said semiconductor module for visually displaying information; and a card terminal for receiving said IC card and communicating therewith, said card terminal including display conversion means, data processing means, and a read/write means connected to said data processing means, said read/write means being operative to read previous information from said memory and storing new information in said memory, and said display conversion means being connected to said data processing means so that said display conversion means can display information on said display section of said IC card that is processed by said data processing means, said display conversion means operating to display information on said display section solely under control of said data processing means, and said display section being operative to display information solely under control of said display conversion means.

6. An IC card system comprising:

an IC card including a semiconductor module having a CPU and a memory for storing information, and a display section electrically independent of said semiconductor module for visually displaying information; and a card terminal for receiving said IC card and communicating therewith, said card terminal including display conversion means, data processing means, and a read/write means connected to said data processing means, said read/write means being operative to read previous information from said memory and store new information in said memory, and means for connecting said display conversion means to said data processing means, said data processing means controlling alone said display conversion means to display information on said display section of said IC card that is processed by said data processing means, and means for communicating said display section with said display conversion means, said display conversion means controlling alone said display section to display information.

* * * * *